United States Patent [19]
Fujita

[11] Patent Number: 6,021,100
[45] Date of Patent: Feb. 1, 2000

[54] MAGNETO-OPTIC DISK DRIVE

[75] Inventor: Masayuki Fujita, Tokyo, Japan

[73] Assignee: NEC Corporation, Tokyo, Japan

[21] Appl. No.: 08/884,644

[22] Filed: Jun. 27, 1997

[30] Foreign Application Priority Data

Jun. 28, 1996 [JP] Japan ..................... 8-169695

[51] Int. Cl.$^7$ ..................... G11B 11/00
[52] U.S. Cl. ..................... 369/13; 360/114
[58] Field of Search ..................... 369/13, 14, 275.5, 369/275.2, 75.1, 75.2, 77.1, 78–79, 100, 109–111, 112, 44.27, 44.32, 44.11, 44.38, 44.26; 360/114, 59; 365/122

[56] References Cited

U.S. PATENT DOCUMENTS

| | | | |
|---|---|---|---|
| 4,807,204 | 2/1989 | Mizutani et al. | 369/13 |
| 4,926,408 | 5/1990 | Murakami et al. | 369/58 |
| 5,333,124 | 7/1994 | Kikuchi et al. | 369/13 |
| 5,533,001 | 7/1996 | Watanabe et al. | 369/275.2 |
| 5,784,343 | 7/1998 | Watanabe et al. | 369/13 |
| 5,790,483 | 8/1998 | Kawai | 369/13 |
| 5,920,535 | 7/1999 | Hisamatsu et al. | 369/83 |

OTHER PUBLICATIONS

High–Speed Magneto–Optical Drive with Overwriting and Read–Verifying Functions by Akinori Watanabe et al.
"Three–Beams Magneto–Optical Disk Drive with Overwright Function", by Toshitaka Iwamoto et al.
"High Performance Three Beam Magneto–Optical Disk Driver" by Shigenori Yanagi et al.

*Primary Examiner*—Ali Neyzari
*Attorney, Agent, or Firm*—Sughrue, Mion, Zinn, Macpeak & Seas, PLLC

[57] ABSTRACT

Disclosed is a magneto-optic disk drive, which has: a holder which holds a magneto-optic disk and rotates the magneto-optic disk in a predetermined direction; two carriages which are opposite to each other while sandwiching the magneto-optic disk and are reciprocatively movable nearly in a radius direction of the magneto-optic disk; and a recording optical head and an erasing optical head which are provided on the respective carriages and project laser light on the magneto-optic disk; wherein the recording optical head and the erasing optical head are disposed adjacent to each other on each of the carriages in the direction along a track formed on the magneto-optic disk, and the recording optical head provided on one of the carriages is disposed opposite to the erasing optical head provided on the other of the carriages.

6 Claims, 10 Drawing Sheets

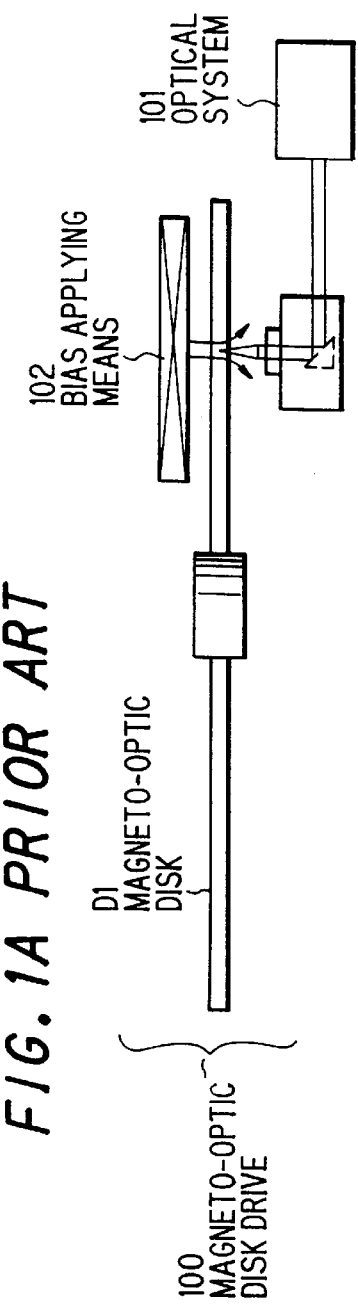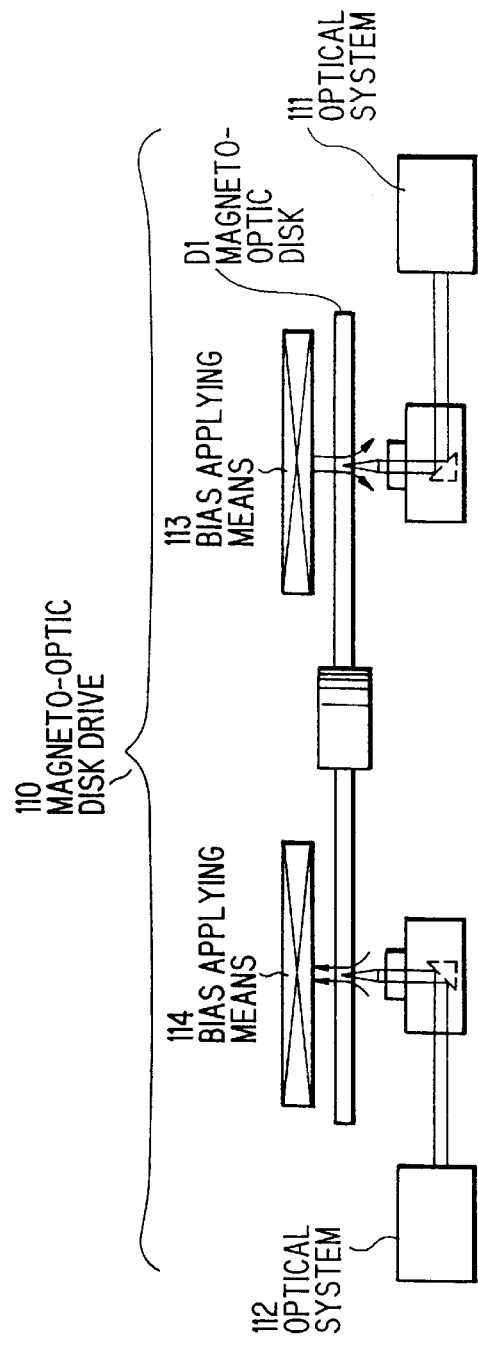

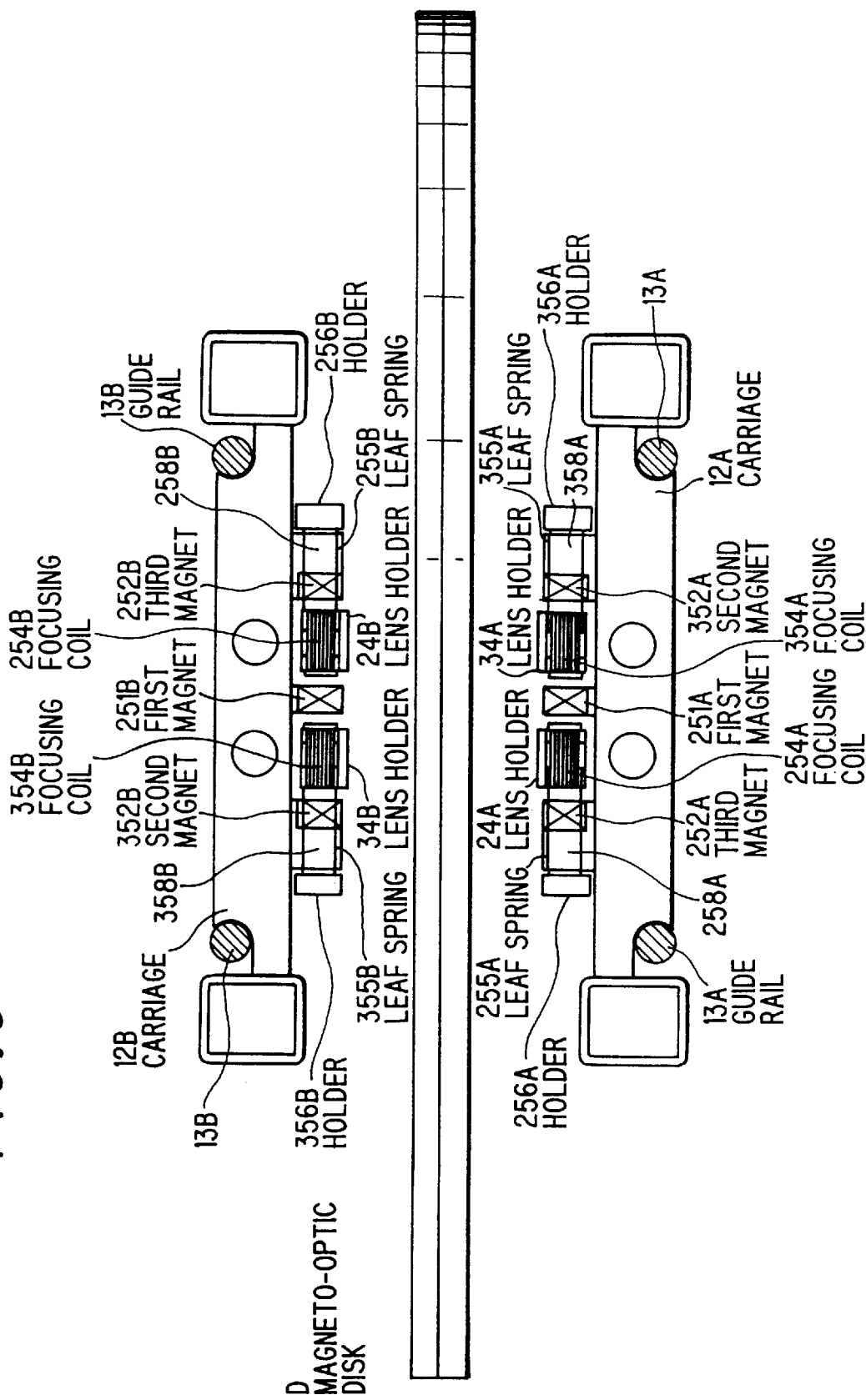

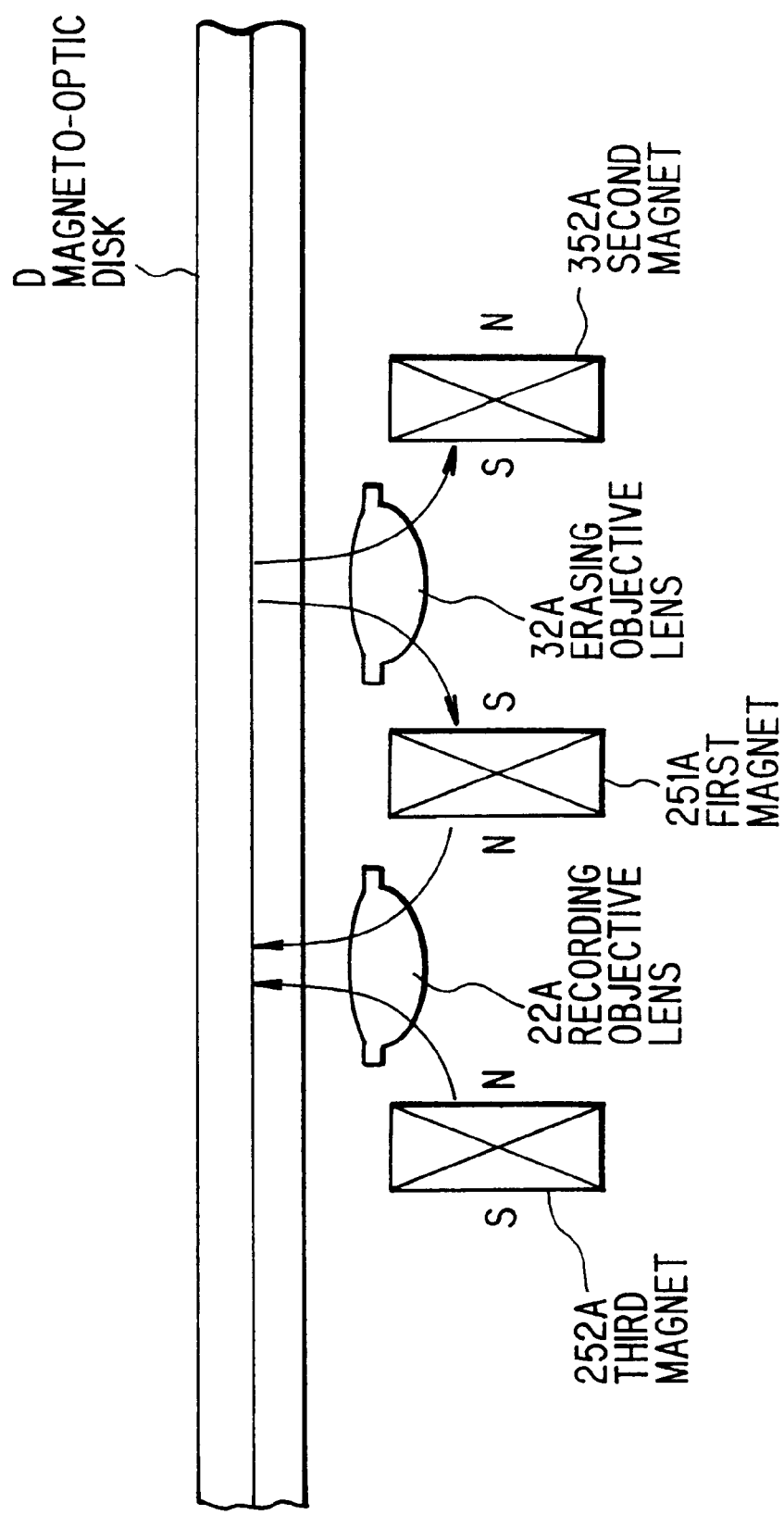

MAGNETO-OPTIC DISK DRIVE

FIELD OF THE INVENTION

This invention relates to a magneto-optic disk drive, and more particularly to, a magneto-optic disk drive used for a magneto-optic disk with upper and lower recording surfaces.

BACKGROUND OF THE INVENTION

In magneto-optic disk drives, the recording and erasing of information are conducted by heating magnetic thin-film on the recording surface of a magneto-optic disk to a temperature greater than Curie point through laser light converged by an objective lens, then directing magnetization direction of an area where the laser light is projected in a desired direction by applying an external bias magnetic field. Therefore, the formation of the external magnetic field is an essential requirement.

FIG. 1A shows a typical conventional magneto-optic disk drive 100 which includes a carriage provided with an optical head composed of an optical system 101 and a bias applying means 102. In this magneto-optic disk drive, when the recording and erasing of information are conducted onto the single recording surface of a magneto-optic disk D1, a desired number of blocks are erased in the first rotation of the magneto-optic disk drive D1 and then data are recorded in the next rotation. Thus, it cannot efficiently process a number of data since the erasing and recording process needs the two rotations of the magneto-optic disk D1.

To improve efficiency in the erasing and recording process, another magneto-optic disk drive has been developed. The magneto-optic disk drive 110, as shown in FIG. 1B, comprises an erasing optical head composed of an optical system 111 and a bias applying means 113 and a recording and reproducing optical head composed of an optical system 112 and a bias applying means 114, where their carriages are disposed symmetrically from the center of a magneto-optic disk D1. In the magneto-optic disk drive 110, the recording and erasing of information can be conducted in one rotation of the magneto-optic disk D1.

However, to a magneto-optic disk with the upper and lower recording surfaces, the magneto-optic disk drive 110 can only access one of the two recording surfaces of the magneto-optic disk. To access the other recording surface, an operator has to change the side of the magneto-optic disk or an external changer or the like is necessary. To solve this problem, a magneto-optic disk drive 120, where two carriages are, as shown in FIG. 2, disposed symmetrically around the rotation center of the magneto-optic disk D and the upper and lower recording surfaces are accessed individually through an erasing optical head and a recording and reproducing optical head provided on the carriages, has been developed.

In this type of magneto-optic disk drive, considering the possibility that biasing magnetic fields of the optical heads may be canceled with each other when the two carriages are disposed close to each other, the two carriages need to be disposed symmetrically around the rotation center of the magneto-optic disk D.

FIGS. 9A and 9B show a typical form of a cartridge 5 including a magneto-optic disk 1 with two recording surfaces. The cartridge 5 is formed as a planar box and is provided with windows located at common positions of the upper and lower surfaces to expose the upper and lower recording surfaces of the magneto-optic disk 1 by moving a slidable shutter 4. Thus, to access the magneto-optic disk 1 received in the cartridge 5, the two carriages of a magneto-optic disk drive have to be disposed at positions opposite to each other. Therefore, the magneto-optic disk drive 120 in FIG. 2 cannot be used to access simultaneously both the recording surfaces of the cartridge-type magneto-optic disk.

Furthermore, the entire magneto-optic disk drive must be enlarged since the carriages are disposed apart from each other.

SUMMARY OF THE INVENTION

Accordingly, it is an object of the invention to provide a magneto-optic disk drive which is effectively adaptable for a cartridge type of magneto-optic disk with upper and lower recording surfaces.

According to the invention, a magneto-optic disk drive, comprises:

a holder which holds a magneto-optic disk and rotates the magneto-optic disk in a predetermined direction;

two carriages which are opposite to each other while sandwiching the magneto-optic disk and are reciprocatively movable nearly in a radius direction of the magneto-optic disk; and a recording optical head and an erasing optical head which are provided on the respective carriages and project laser light on the magneto-optic disk;

wherein the recording optical head and the erasing optical head are disposed adjacent to each other on each of the carriages in the direction along a track formed on the magneto-optic disk, and the recording optical head provided on one of the carriages is disposed opposite to the erasing optical head provided on the other of the carriages.

According to another aspect of the invention, a magneto-optic disk drive, comprises:

a holder which holds a magneto-optic disk and rotates the magneto-optic disk in a predetermined direction;

two carriages which are opposite to each other while sandwiching the magneto-optic disk and are reciprocatively movable nearly in a radius direction of the magneto-optic disk; and a recording optical head and an erasing optical head which are provided on the respective carriages and project laser light on the magneto-optic disk;

wherein the recording optical head and the erasing optical head are disposed adjacent to each other on each of the carriages in the direction along a track formed on the magneto-optic disk, and both the recording optical heads provided on the carriages are disposed opposite to both the erasing optical heads provided on the carriages.

BRIEF DESCRIPTION OF THE DRAWINGS

The invention will be explained in more detail in conjunction with the appended drawings, wherein:

FIG. 1A is an illustration showing a conventional magneto-optic disk drive with a single optical head, FIG. 1B is an illustration showing another conventional magneto-optic disk drive with a recording and reproducing optical head and an erasing optical head, FIG. 6 is a front view of the magneto-optic disk drive in FIG. 3 seen from the edge side of a magneto-optic disk along the movement direction of the carriage, FIGS. 7A and 7B are illustrations showing directions of leakage magnetic field generated by magnets on the carriages, FIG. 9A shows a state that a shutter is opened and a magneto-optic disk is exposed, and FIG. 9B shows a state that the shutter is closed.

DESCRIPTION OF THE PREFERRED EMBODIMENTS

A magneto-optic disk drive in the first preferred embodiment will be explained in FIGS. 3 to 7B.

In this embodiment, provided is a magneto-optic disk drive 10 by which the recording, reproducing and erasing of information on a magneto-optic disk D with upper and lower recording surfaces, which is composed of two disks adhered, are conducted.

The magneto-optic disk drive 10 comprises a holder 11 which holds the magneto-optic disk D and drives it to rotate in a predetermined direction, two carriages 12A, 12B which are opposite to each other while sandwiching the magneto-optic disk D to be held and reciprocate nearly in the radius direction of the magneto-optic disk D, and recording optical heads 2A, 2B and erasing optical heads 3A, 3B which are provided on the carriages 12A, 12B and emit laser light to the magneto-optic disk D.

On the upper surface(the surface on the side of the magneto-optic disk D) of the carriage 12A, provided are the recording optical head 2A and erasing optical head 3A to conducts the recording, reproducing and erasing to the lower recording surface of the magneto-optic disk D. On the lower surface(the surface on the side of the magneto-optic disk D) of the carriage 12B, provided are the recording optical head 2B and erasing optical head 3B to conducts the recording, reproducing and erasing to the upper recording surface of the magneto-optic disk D.

The carriages 12A, 12B are of planar members disposed parallel to the recording surface of the magneto-optic disk D held by the holder 11. On the planar members, the recording optical head 2A and erasing optical head 3A and the recording optical head 2B and erasing optical head 3B, respectively, are adjacent to each other in the direction of a track formed on the recording surface of the magneto-optic disk D. When the carriages 12A, 12B are located at a position where they are opposite to each other, the recording optical head 2A and erasing optical head 3B and the recording optical head 2B and erasing optical head 3A, respectively, are opposite to each other with the carriage 12A, the erasing optical head 3A is disposed Just upstream to the recording optical head 2A in the rotation direction of the magneto-optic disk D.

Figure 4:
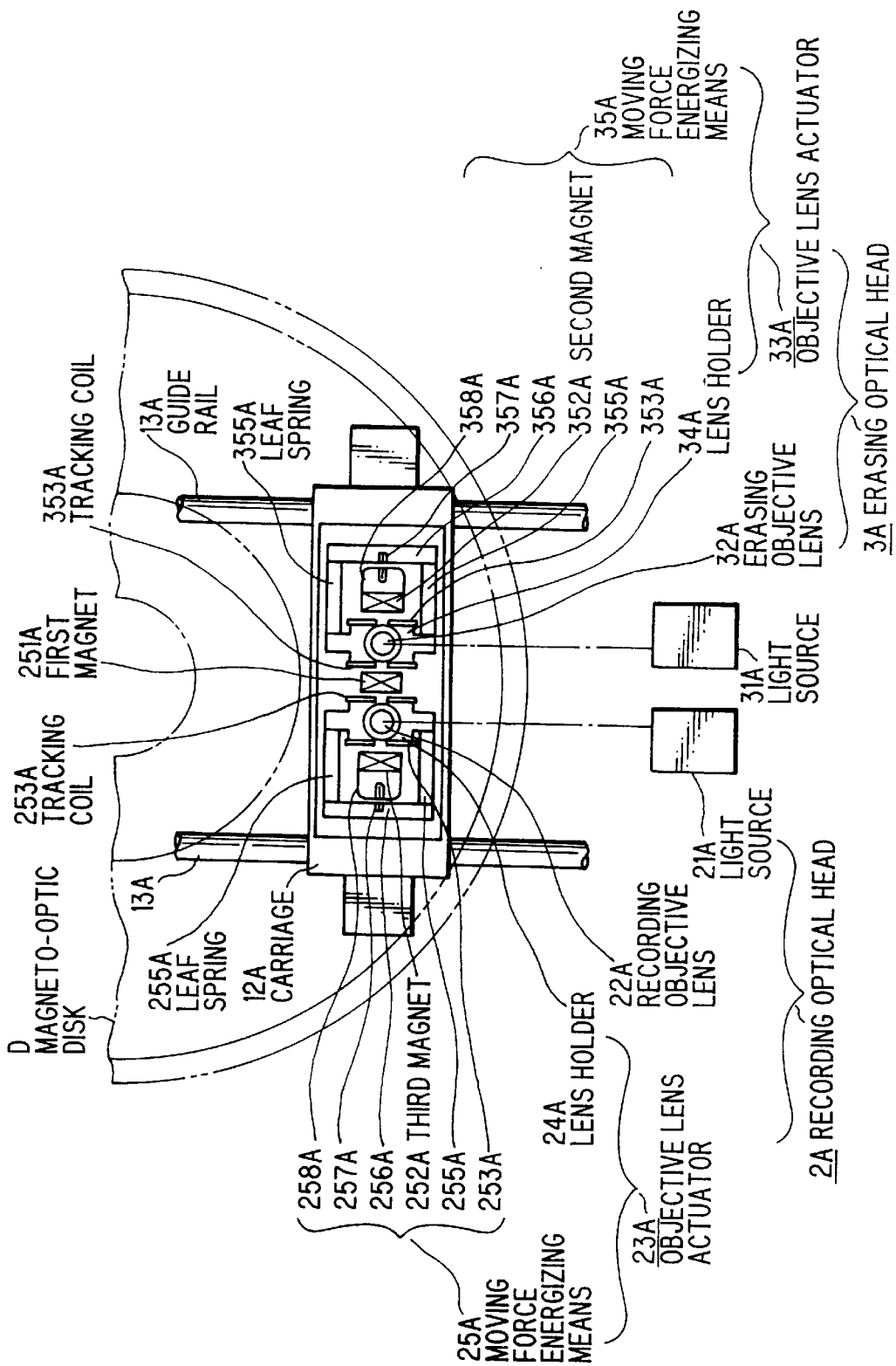
FIG. 4 is a plan view showing a carriage and optical heads mounted thereon included downward in the magneto-optic disk drive in FIG. 3.
Figure 5:
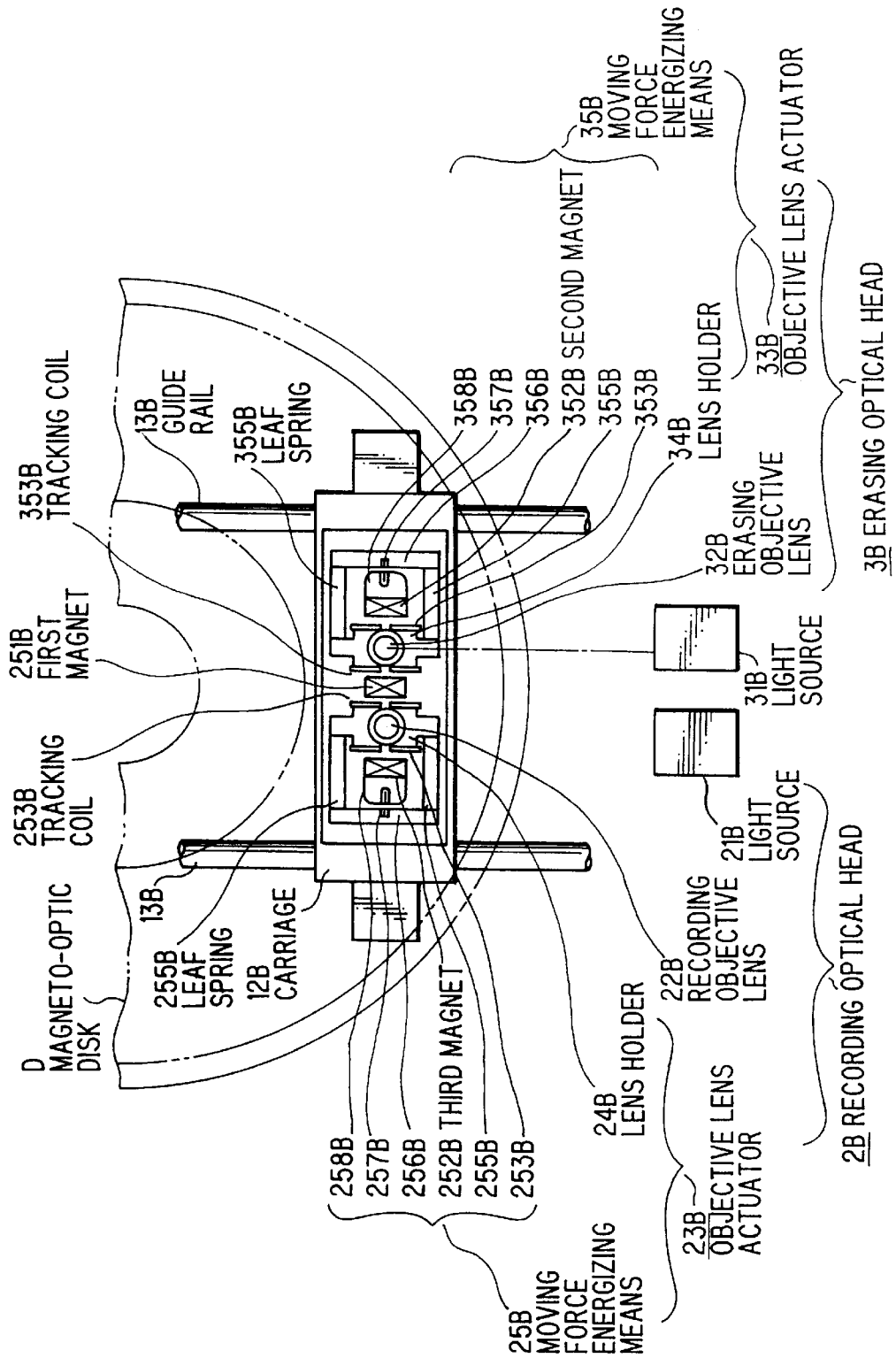
FIG. 5 is a plan view showing a carriage and optical heads mounted thereon included upward in the magneto-optic disk drive in FIG. 3.
Figure 7B:
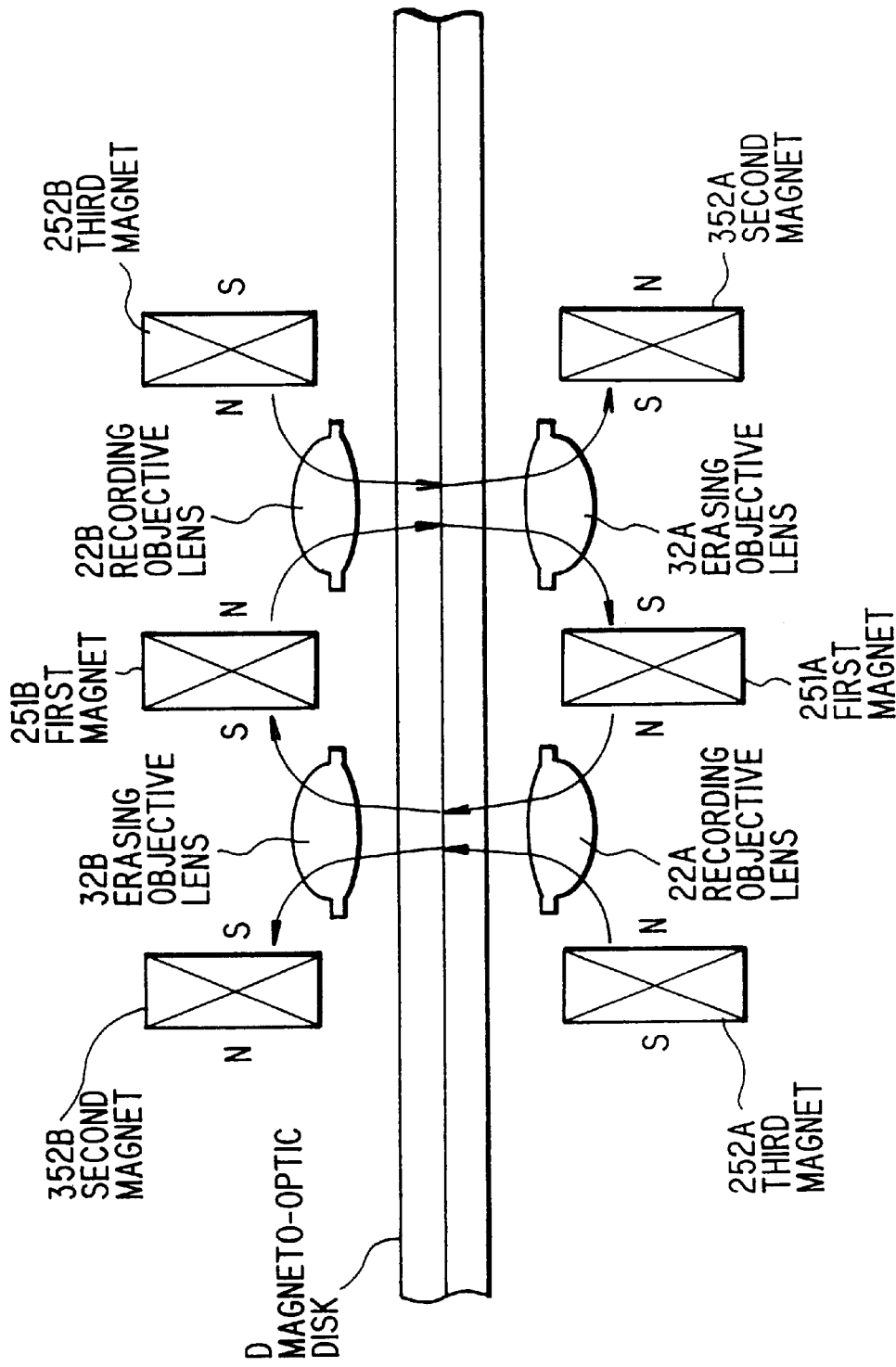

The respective parts of the magneto-optic disk drive 10 in the embodiment will be detailed below. FIG. 4 shows the recording optical head 2A and the erasing optical head 3A seen from a viewpoint over them. FIG. 5 shows the recording optical head 2B and the erasing optical head 3B seen from a viewpoint under them. FIG. 6. shows the carriages 12A, 12B and the optical heads 2A, 2B, 3A and 3B seen from the edge to the center of the magneto-optic disk D along the movement direction of the carriages 12A, 12B. FIGS. 7A and 7B show positional relationships between magnets and objective lenses described later and biasing magnetic field directions.

Meanwhile, the composition of the carriage 12B is similar to that of the carriage 12A. Therefore, explanation of like parts in FIG. 5 indicated by like reference numerals, which are referred to in parentheses below, as used in FIG. 4 is omitted.

Figure 2:
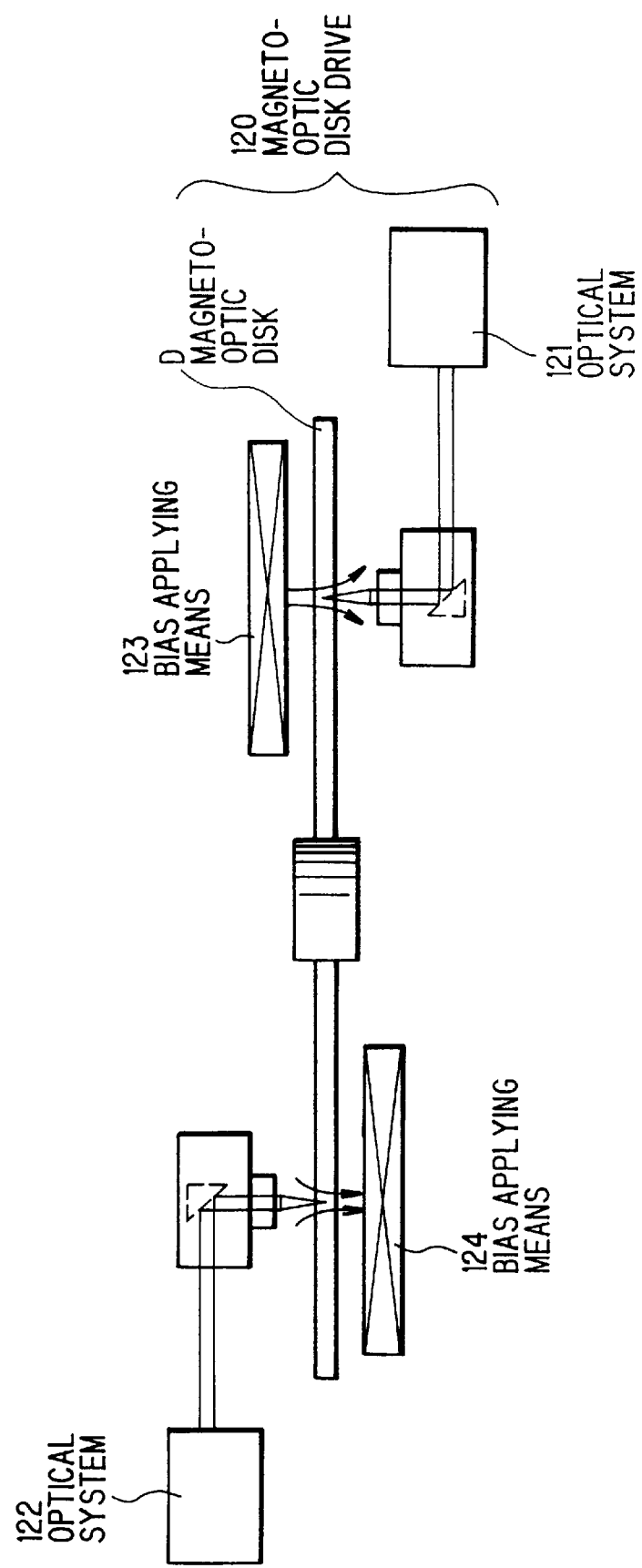
FIG. 2 is an illustration showing a conventional magneto-optic disk drive adapted for a magneto-optic disk with upper and lower recording surfaces.
Figure 3:
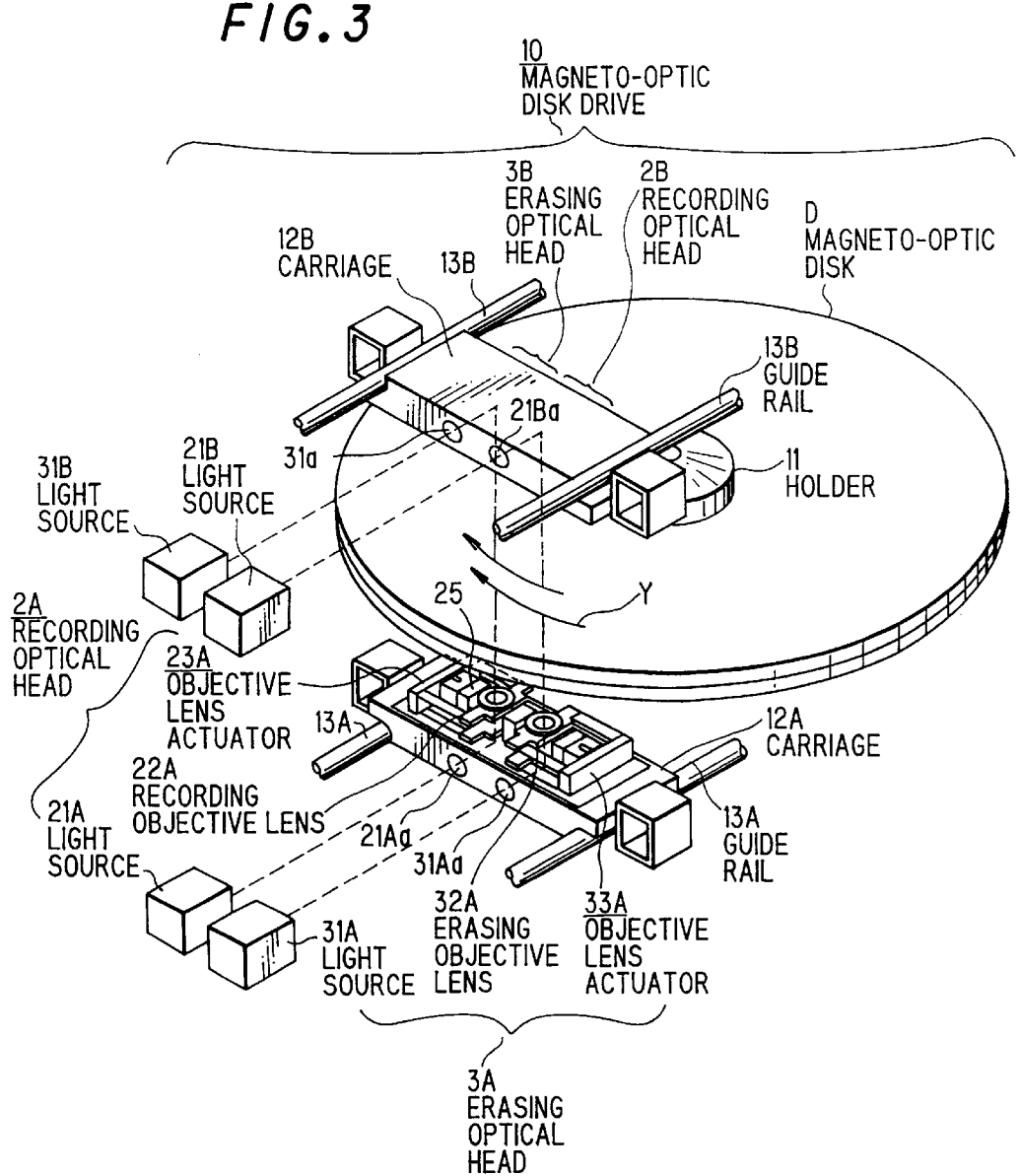
FIG. 3 is a schematic perspective view showing a magneto-optic disk drive in a preferred embodiment according to the invention.

The magneto-optic disk D is held by the holder 11 which can be inserted through a penetrating hole at the center of the magneto-optic disk D, and the holder 11 gives a rotational power in a direction shown by an arrow Y in FIG. 3 to the magneto-optic disk D.

The carriage 12A(12B) is held slidably along two guide rails 13A, 13A(13B, 13B) which are disposed parallel to the radius direction of the magneto-optic disk D and is provided with a drive means(not shown) which drives the carriage 12A(12B).

Also, the carriage 12A(12B) is provided with guide holes 21A$a$(21B$a$), 31A$a$(31A$a$) and reflecting means(not shown) which serve to project laser light emitted from light sources 21A(21B), 31A(31B) of the recording optical head 2A(2B) and erasing optical head 3A(3B) described later through objective lenses 22A(22B), 32A(32B) perpendicularly to the recording surface of the magneto-optic disk D.

Next, the recording optical head 2A(2B) and the erasing optical head 3A(3B) will be detailed. The recording optical head 2A(2B) comprises the recording objective lens 22A (22B) which is disposed close and opposite to the magneto-optic disk D and has an optical axis perpendicular to the recording surface of the magneto-optic disk D, an objective lens actuator 23A(23B) which controls the tracking and focusing of the objective lens 22A(22B), and the light source 21A(21B) which emits laser light to the magneto-optic disk D and detects magnetic orientations on a track of the magneto-optic disk D from reflected light.

The objective lens actuator 23A(23B) comprises a lens holder 24A(24B) which holds the recording objective lens 22A(22B) and a moving force energizing means 25A(25B) which energizes a moving force in the focusing and tracking direction through the lens holder 24A(24B).

The moving force energizing means 25A(25B) comprises a first magnet 251A(251B) and a third magnet 252A(252B) which are permanent magnets, a structure which holds the lens holder 24A(24B) swingable in the tracking direction (nearly in the radius direction of the magneto-optic disk D) and in the focusing direction(up and down directions in FIG. 6), and a tracking coil 253A(253B) for generating attractive and repulsive forces in the tracking direction and a focusing coil 254A(254B) for generating attractive and repulsive forces in the focusing direction between the magnets 251A (251B) and 252A(252B) by feeding, which are provided on the lens holder 24A(24B).

The first magnet 251A(251B) is fixed on the carriage 12A(12B) between the erasing objective lens 32A(32B) and the recording objective lens 22A(22B) with its N-pole faced to the recording objective lens 22A(22B), and the third magnet 252A(252B) is fixed on the carriage 12A(12B) with its N-pole faced through the recording objective lens 22A (22B) to the first magnet 251A(251B).

Thus, the first magnet 251A(251B) and the third magnet 252A(252B) are lined up along the direction of a track on the magneto-optic disk D while sandwiching the recording objective lens 22A(22B), and the directions of magnet pole in both the magnets 251A(251B) and 252A(252B) are provided along the direction of a track on the magneto-optic disk D.

The above-mentioned structure for holding the lens holder 24A(24B) swingable will be detailed below. The lens holder 24A(24B) is supported by four leaf springs 255A connected to upper and lower positions of its both ends, where the other ends of the leaf springs 255A(255B) are supported by a holder 256A(256B). Therefore, the recording objective lens 22A(22B) can be supported while being movable up and down in the focusing direction. Furthermore, a holder 256A(256B) is connected through a leaf spring 257A(257B) to a fixing holder 258A fixed on the carriage 12A(12B). By the leaf spring 257A(257B), the recording objective lens 22A(22B) can be supported while being movable in the tracking direction(in the radius direction of the magneto-optic disk D).

In the above-mentioned composition, by using magnetic flux generating from the first magnet 251A(251B) and the third magnet 252A(252B) and electromagnetic force generated by feeding to the coils, the servo-control in the focusing and tracking directions can be conducted based on a focusing error signal and a tracking error signal obtained from the light source 21A(21B) so that the recording and reproducing objective lens 22A(22B) can be carried to a desired position. Therefore, the laser light projected through the recording objective lens 22A(22B) can always follow a desired track on the recording surface even when track vibration or eccentricity occurs during the rotation of the magneto-optic disk D.

On the other hand, the erasing optical head 3A(3B) has a composition similar to that of the recording optical head 2A(2B) and is disposed symmetrically to the recording optical head 2A(2B) through a plane located in the middle of the heads 2A(2B) and 3A(3B) which is parallel to the movement direction of the carriage 12A(12B) and perpendicular to the magneto-optic disk D.

The erasing optical head 3A(3B) comprises the erasing objective lens 32A(32B) which is disposed close and opposite to the magneto-optic disk D and has an optical axis perpendicular to the recording surface of the magneto-optic disk D, an objective lens actuator 33A(33B) which controls the tracking and focusing of the objective lens 32A(32B), and the light source 31A(31B) which emits laser light to the magneto-optic disk D and detects magnetic orientations on a track of the magneto-optic disk D from reflected light.

The objective lens actuator 33A(33B) comprises a lens holder 34A(34B) which holds the erasing objective lens 22A(22B) and a moving force energizing means 35A(35B) which energizes a moving force in the focusing and tracking direction through the lens holder 34A(34B).

The moving force energizing means 35A(35B) comprises the first magnet 251A(251B) and a second magnet 352A(352B) which are permanent magnets, a structure which holds the lens holder 34A(34B) swingable in the tracking direction(nearly in the radius direction of the magneto-optic disk D) and in the focusing direction(up and down directions in FIG. 6), and a tracking coil 353A(353B) for generating attractive and repulsive forces in the tracking direction and a focusing coil 354A(354B) for generating attractive and repulsive forces in the focusing direction between the magnets 251A(251B) and 352A(352B) by feeding, which are provided on the lens holder 34A(34B).

The first magnet 251A(251B), which is commonly used in the moving force energizing means 25A(253), is fixed on the carriage 12A(12B) between the erasing objective lens 32A(32B) and the recording objective lens 22A(22B) with its S-pole faced to the erasing objective lens 32A(32B), and the second magnet 352A(352B) is fixed on the carriage 12A(12B) with its S-pole faced through the erasing objective lens 32A(32B) to the first magnet 251A(251B).

Thus, the first magnet 251A(251B) and the second magnet 352A(352B) are lined up along the direction of a track on the A; magneto-optic disk D while sandwiching the erasing objective lens 32A(32B), and the directions of magnet pole in both the magnets 251A(251B) and 352A(352B) are provided along the direction of a track on the magneto-optic disk D.

Namely, the first magnet 251A(251B) and the second magnet 352A(352B), together with the third magnet 252A(252B), are lined up along the direction of a track on the magneto-optic disk D while opposing the same magnetic poles to one another.

The above-mentioned structure for holding the lens holder 34A(34B) swingable will be detailed below. The lens holder 34A(34B) is supported by four leaf springs 355A connected to upper and lower positions of its both ends, where the other ends of the leaf springs 355A(355B) are supported by a holder 356A(356B). Therefore, the erasing objective lens 32A(32B) can be supported while being movable up and down in the focusing direction. Furthermore, a holder 356A(356B) is connected through a leaf spring 357A(357B) to a fixing holder 358A fixed on the carriage 12A(12B). By the leaf spring 357A(357B), the erasing objective lens 32A(32B) can be supported while being movable in the tracking direction(in the radius direction of the magneto-optic disk D).

In the above-mentioned composition, by using magnetic flux generating from the first magnet 251A(251B) and the second magnet 352A(352B) and electromagnetic force generated by feeding to the coils, the servo-control in the focusing and tracking directions can be conducted based on a focusing error signal and a tracking error signal obtained from the light source 31A(31B) so that the erasing objective lens 32A(32B) can be carried to a desired position. Therefore, the laser light projected through the erasing objective lens 32A(32B) can always follow a desired track on the recording surface even when track vibration or eccentricity occurs during the rotation of the magneto-optic disk D.

With the first, second and third magnets 251A, 352A and 252A, a distribution of magnetic flux density as shown in FIG. 7A is obtained, and there occurs leakage magnetic field with directions of magnetic field different to each other in the perpendicular and up direction of the erasing and recording objective lenses 22A, 32A. Thus, the first, second and third magnets 251A, 352A and 252A generate the leakage magnetic field in a direction nearly perpendicular to the recording surface of the magneto-optic disk D, and the leakage magnetic field has a magnetic force fell within a predetermined intensity of bias magnetic field required for erasing and recording of the magneto-optic disk D.

In general, the intensity of bias magnetic field to magneto-optic disks is nearly 200 to 400(Oe). The above-mentioned composition can sufficiently obtain a magnetic force of 200 to 400(Oe) since the leakage magnetic field is so large.

Thus, in this composition of the embodiment, an independent means for generating the bias magnetic field, which is conventionally used in recording and erasing to the magneto-optic disk D, is not necessary. Instead, the magnets 251A, 352A and 252A of the moving force energizing means 25A and 35A can function also as such means. Also, the magnets 251B, 352B and 252B of the moving force energizing means 25A and 35A on the carriage 12B can function similarly.

If necessary, a yoke member or the like may be provided around the magnets 251A, 352A and 252A(251B, 352B and 252B), where the above-mentioned bias magnetic field can be generated by using the magnets and yoke members with a specific structure.

Next, the operation of the magneto-optic disk drive 10 in the embodiment will be explained. Though the magneto-optic disk drive 10 can conduct the recording, reproducing and erasing onto one or both of the recording surfaces of the magneto-optic disk D, the explanation below is mainly given for the carriage 12A while omitting similar explanation for the carriage 12B.

When erasing on the magneto-optic disk D is conducted, the carriage 12A moves to carry the erasing objective lens 32A of the erasing optical head 3A to suitably face to a specific block of a specific track. In this state, laser light is already emitted from the light source 31A and the reflected light is detected by the light source 31A. Then, focusing and tracking is conducted by the objective lens actuator 33A based on error signals to be detected.

The erasing objective lens 32A is moved by a predetermined variation in the focusing direction (up and down direction in FIG. 6) and in the tracking direction (up and down direction in FIG. 4) through the lens holder 34A to which attractive and repulsive forces generated between the first and second magnets 251A and 352A by feeding to the focusing coil 354A and the tracking coil 353a are applied, so that the laser light is projected just on the specific track and the focal point is formed just on the specific track.

The output power of laser light emitted from the light source in such erasing operation is set to be higher than that in reproducing operation, whereby a specific block on a track is uniformly heated at a temperature higher than Curie point by the laser light. Simultaneously, the heated block is magnetized to have a magnet pole through leakage magnetic field formed by the first and second magnets 251A, 352A.

When the carriages 12A, 12B are located close to each other, where erasing is conducted on the side of the carriage 12A and recording is conducted on the side of the carriage 12B, leakage magnetic field formed by the first and second magnets 251A and 352A on both sides of the erasing objective lens 32A, as shown in FIG. 7B, has the same direction of magnetic field as that formed by the first and third magnets 251B and 252B on both sides of the recording objective lens 22B. Therefore, recording and erasing on the upper and lower recording surfaces, respectively, of the magneto-optic disk D can be suitably conducted without canceling the magnetic fields therebetween.

Recording operation on the magneto-optic disk D is conducted similarly to the above-mentioned erasing operation. The carriage 12A is positioned, then laser light with output power nearly equal to that in the erasing is projected only on a predetermined spot according to record information on the specific track where the erasing is already conducted through the recording objective lens 22A adjusted by focusing and tracking, then leakage magnetic field in the reverse direction to erasing formed by the first and third magnets 251A, 252A is applied while heating the spot up to Curie point, whereby magnetization in the reverse direction to erasing is completed.

When the carriages 12A, 12B are located close to each other, where recording is conducted on the side of the carriage 12A and erasing is conducted on the side of the carriage 12B, leakage magnetic field formed by the first and third magnets 251A and 252A and leakage magnetic field formed by the first and second magnets 251B and 352B, where the former magnets and the latter magnets are opposite to each other through the magneto-optic disk D, as shown in FIG. 7B, have the same direction of magnetic field. Therefore, erasing and recording on the lower and upper recording surfaces, respectively, of the magneto-optic disk D can be suitably conducted without canceling the magnetic fields therebetween.

Furthermore, in reproducing operation on the magneto-optic disk D, the carriage 12A is positioned, then laser light with output power less than that in the erasing is projected on a specific block on a specific track through the recording objective lens 22A adjusted by focusing and tracking, then reflected light is detected by the light source 21A to identify the magnetization direction of the block. Based on this detection, the reproducing on the magneto-optic disk D is completed.

As described above, in this embodiment, for the carriage 12A, the erasing optical head 3A is located just upstream of the recording optical head 2A. Therefore, erasing and recording operation on the magneto-optic disk D can be quickly conducted. For the carriage 12B, the recording optical head 2B and erasing optical head 3B are adjacent to each other on the same carriage 12B. Therefore, erasing and recording operation can be conducted within a revolution of the magneto-optic disk D. Though this operation is conducted a litter slower than that in the carriage 12A, the process speed is still faster than that of the conventional magneto-optic disk drive. Thus, a great number of data can be continually processed at a high speed.

Also, the magneto-optic disk drive 10 in the embodiment is provided with the carriages 12A, 12B which are disposed opposite to each other on both sides of the magneto-optic disk D and are provided with the optical heads 2A, 3B and the optical heads 2B, 3B, respectively. Therefore, the magneto-optic disk drive can be effectively adapted for a magneto-optic disk with upper and lower recording surfaces, and it is not necessary to change the side of the magneto-optic disk and an external changer is not necessary.

Furthermore, the two carriages 12A, 12B are disposed to move in the same regions over and under the magneto-optic disk D. Therefore, they can access the upper and lower recording surfaces of such a magneto-optic disk as received in a cartridge 5 by which the upper and lower access regions are limited, without changing the side of the magneto-optic disk.

Also, the two carriages 12A, 12B are not disposed symmetrically around the center of the magneto-optic disk as in the conventional magneto-optic disk drive. Therefore, the entire magneto-optic disk drive can be much miniaturized.

Furthermore, when the carriages 12A, 12B are located close to each other, the recording optical head 2A and the erasing optical head 3B are opposite to each other and the erasing optical head 3A and the recording optical head 2B are opposite to each other. In this case, erasing and recording operation can be suitably conducted without canceling the magnetic fields therebetween. Thus, erase error and record error can be effectively prevented and the reliability can be enhanced.

Also, in this embodiment, the bias magnetic field for recording and erasing on the magneto-optic disk is generated by the first, second and third magnets 251A(251B), 352A(352B) and 252A(252B) composing the moving force energizing means 25A(25B) and 35A(35B). Therefore, an independent means for generating the bias magnetic field, which is conventionally used in recording and erasing to the magneto-optic disk D, is not necessary. Thus, the number of parts can be reduced and the entire magneto-optic disk drive can be miniaturized.

Though, in the above embodiment, the actuators where the lens holder with the objective lens is supported by the leaf spring are used and the optical heads employ a separation type of optical system, a wire-supporting type or width-sliding type of optical head or an optical head integrated on a carriage or the like may be used.

Though, in the above embodiment, S-poles are opposite between the first and second magnets and N-poles are opposite between the first and third magnets, N-poles may be opposite between the first and second magnets and S-poles may be opposite between the first and third magnets.

Though, in the above embodiment, reproducing on the magneto-optic disk D is conducted by using the recording optical heads to 2A and 2B, the erasing optical heads 3A, 3B may be used for reproducing. In this case, laser light with output power less than that in erasing can be projected from the erasing optical heads 3A, 3B.

Figure 8:
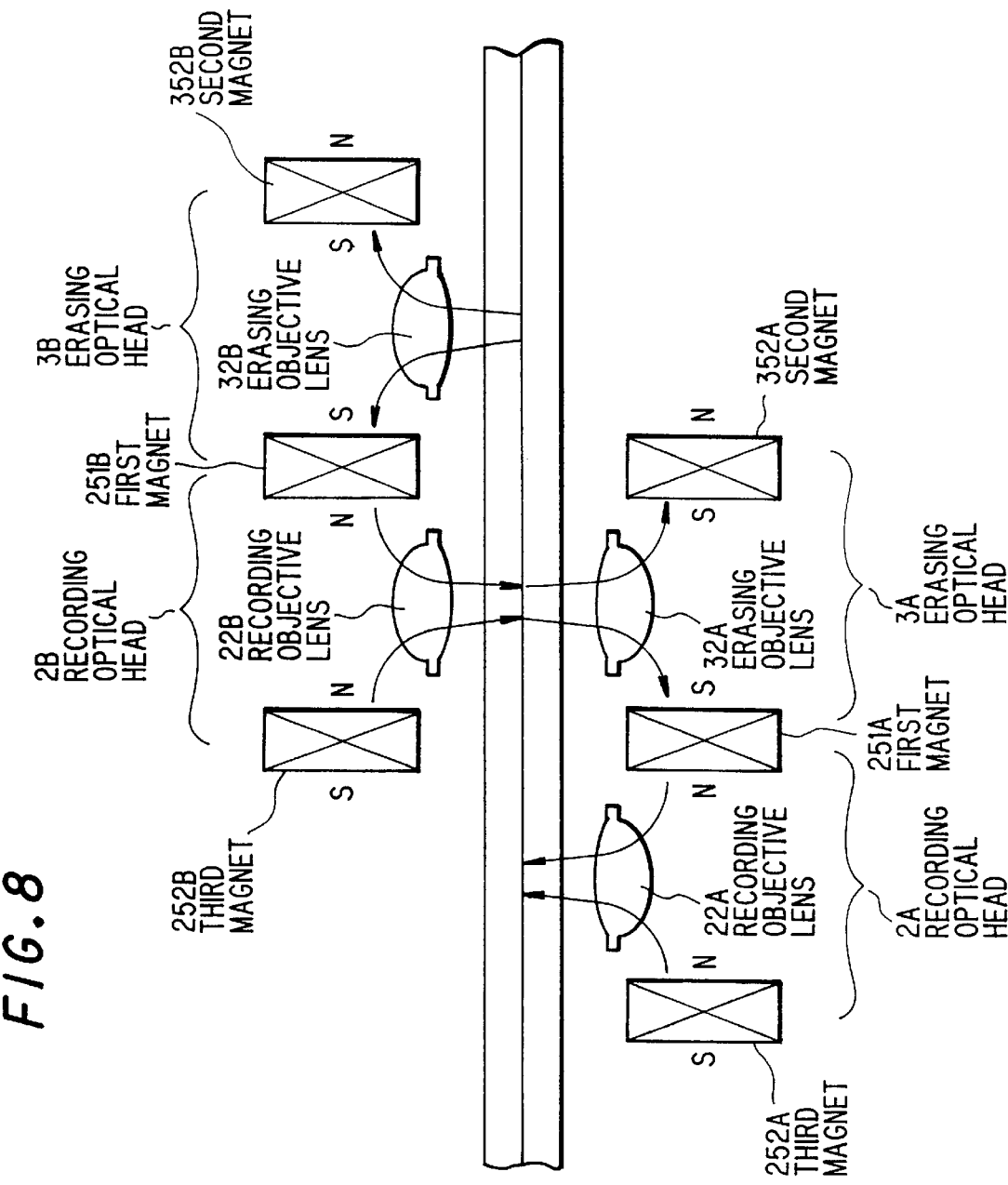
FIG. 8 is a illustration showing a magneto-optic disk drive in a second preferred embodiment according to the invention.
Figure 9A:
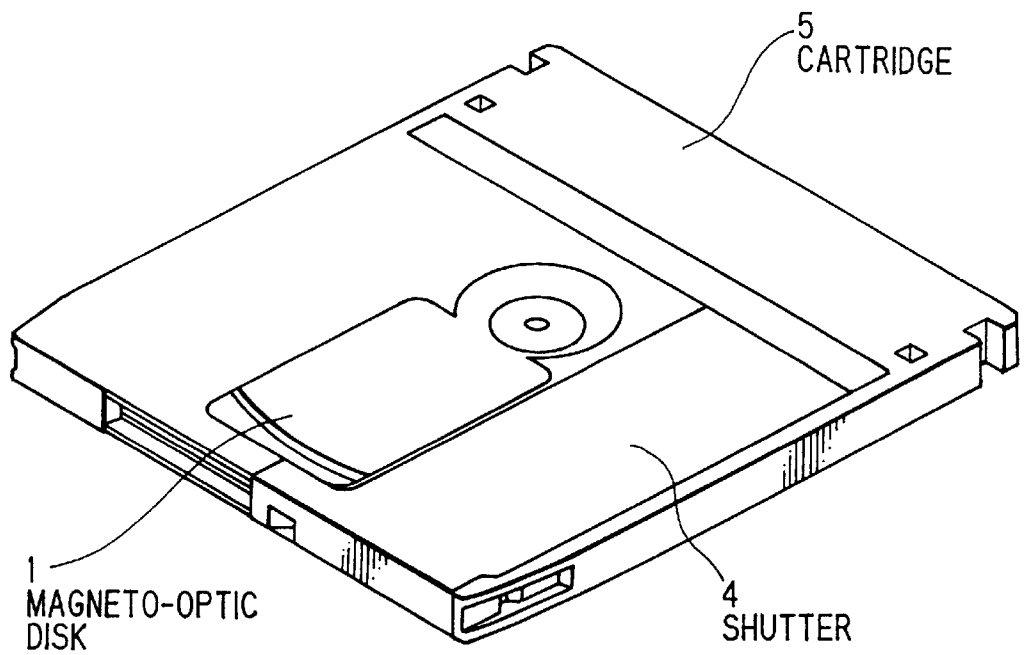
FIGS. 9A and 9B are perspective views showing a cartridge-type of magneto-optic disk, where
Figure 9B:
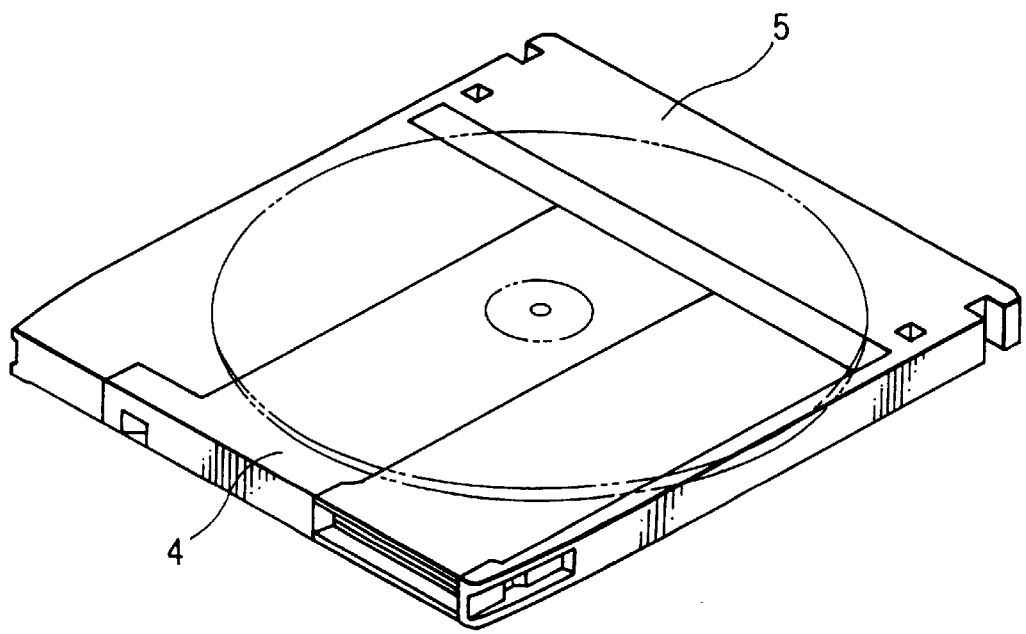

A magneto-optic disk drive in the second preferred embodiment will be explained in FIG. 8. In the second embodiment, the carriage 12B may be disposed shifted in the track direction of the magneto-optic disk from the carriage 12A, where the erasing optical head 3A of the carriage 2A and the recording optical head 2B of the carriage 12B are opposite to each other when the carriages 12A and 12B are located close to each other.

In the second embodiment, on both the carriages 12A and 12B, the erasing optical heads 3A, 3B can be located upstream of the recording optical heads 2A, 2B in the rotational direction of the magneto-optic disk D. Therefore, by both the carriages 12A and 12B, erasing and recording operation can be continually and quickly conducted. Thus, a greater number of data can be processed at a high speed.

Also in the second embodiment, when the carriages 12A, 12B are located close to each other, where erasing operation is conducted on the side of the carriage 12A and recording operation is conducted on the side of the carriage 12B. Therefore, erasing and recording operation can be suitably conducted without canceling the magnetic fields therebetween.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A magneto-optic disk drive, comprising:
    a holder which holds a magneto-optic disk and rotates said magneto-optic disk in a predetermined direction;
    two carriages which are opposite to each other while sandwiching said magneto-optic disk and are reciprocatively movable nearly in a radius direction of said magneto-optic disk; and
    a recording optical head and an erasing optical head which are provided on said respective carriages and project laser light on said magneto-optic disk;
    wherein said recording optical head and said erasing optical head are disposed adjacent to each other on each of said carriages in the direction along a track formed on said magneto-optic disk, and
    said recording optical head provided on one of said carriages is disposed opposite to said erasing optical head provided on the other of said carriages.

2. A magneto-optic disk drive, comprising;
    a holder which holds a magneto-optic disk and rotates said magneto-optic disk in a predetermined direction;
    two carriages which are opposite to each other while sandwiching said magneto-optic disk and are reciprocatively movable nearly in a radius direction of said magneto-optic disk; and
    a recording optical head and an erasing optical head which are provided on said respective carriages and project laser light on said magneto-optic disk;
    wherein said recording optical head and said erasing optical head are disposed adjacent to each other on each of said carriages in the direction along a track formed on said magneto-optic disk, and
    both said recording optical heads provided on said carriages are disposed opposite to both said erasing optical heads provided on said carriages.

3. A magneto-optic disk drive, according to claim 1, wherein:
    said recording and erasing optical heads provided on said carriages comprise a recording objective lens and an erasing objective lens which are disposed close to said magneto-optic disk, and objective lens actuators for adjusting tracking and focusing of said objective lenses, and
    said objective lens actuators comprise two lens holders which hold individually said recording objective lens and said erasing objective lens, and moving force energizing means which energize moving force in focusing and tracking directions through said lens holders.

4. A magneto-optic disk drive, according to claim 2, wherein;
    said recording and erasing optical heads provided on said carriages comprise a recording objective lens and an erasing objective lens which are disposed close to said magneto-optic disk, and objective lens actuators for adjusting tracking and focusing of said objective lenses, and
    said objective lens actuators comprise two lens holders which hold individually said recording objective lens and said erasing objective lens, and moving force energizing means which energize moving force in focusing and tracking directions through said lens holders.

5. A magneto-optic disk drive, according to claim 3, wherein:
    said moving force energizing means comprises a first magnet which is disposed between said erasing objective lens and said recording objective lens while directing its specific magnetic pole to one of said erasing and recording objective lenses, a second magnet which is disposed directing its magnetic pole identical with that of said first magnet to said first magnet, a third magnet which is disposed directing its magnetic pole identical with that of said first magnet to said first magnet, and a plurality of coils which generates attractive force and repulsive force in predetermined directions by feeding, and
    each of said magnets has such a magnetic force that leakage magnetic field formed perpendicularly to said magneto-optic disk among said first and second magnets and said first and third magnets on said carriage is within an intensity of bias magnetic field required for recording and erasing operation on said magneto-optic disk.

6. A magneto-optic disk drive, according to claim 4, wherein:

said moving force energizing means comprises a first magnet which is disposed between said erasing objective lens and said recording objective lens while directing its specific magnetic pole to one of said erasing and recording objective lenses, a second magnet which is disposed directing its magnetic pole identical with that of said first magnet to said first magnet, a third magnet which is disposed directing its magnetic pole identical with that of said first magnet to said first magnet, and a plurality of coils which generates attractive force and repulsive force in predetermined directions by feeding, and each of said magnets has such a magnetic force that leakage magnetic field formed perpendicularly to said magneto-optic disk among said first and second magnets and said first and third magnets on said carriage is within an intensity of bias magnetic field required for recording and erasing operation on said magneto-optic disk.

\* \* \* \* \*